(12) United States Patent
Sterner (10) Patent No.: US 8,720,070 B2
(45) Date of Patent: May 13, 2014

(54) PIPE PEELER

(75) Inventor: Robert M. Sterner, Erie, PA (US)

(73) Assignee: Reed Manufacturing Company, Erie, PA (US)

( * ) Notice: Subject to any disclaimer, the term of this patent is extended or adjusted under 35 U.S.C. 154(b) by 30 days.

(21) Appl. No.: 13/289,670

(22) Filed: Nov. 4, 2011

(65) Prior Publication Data

US 2013/0111764 A1  May 9, 2013

(51) Int. Cl.
*B23D 21/06* (2006.01)
*B26D 3/16* (2006.01)

(52) U.S. Cl.
USPC .................................. 30/95; 30/100

(58) Field of Classification Search
USPC ................... 30/93, 94, 95, 96, 100
See application file for complete search history.

(56) References Cited

U.S. PATENT DOCUMENTS

| | | | | |
|---|---|---|---|---|
| 444,995 A * | 1/1891 | Vanderman | ................ | 30/100 |
| 478,824 A | 7/1892 | Shostak | | |
| 1,130,395 A * | 3/1915 | Gilmour | ................ | 30/100 |
| 1,173,496 A * | 2/1916 | Elzay | ................ | 30/100 |
| 2,281,366 A * | 4/1942 | Metcalf | ................ | 30/100 |
| 2,381,156 A * | 8/1945 | Gill et al. | ................ | 30/100 |
| 2,392,490 A | 1/1946 | Maruri | | |
| 2,483,338 A | 9/1949 | Douglas | | |
| 2,629,925 A * | 2/1953 | Gill et al. | ................ | 30/100 |
| 2,639,501 A * | 5/1953 | Harding | ................ | 30/100 |
| 2,641,103 A * | 6/1953 | Gill | ................ | 30/100 |
| 2,665,444 A | 1/1954 | Nelson | | |
| 2,761,212 A * | 9/1956 | Gill | ................ | 30/100 |
| 2,962,814 A * | 12/1960 | Gill | ................ | 30/100 |
| 2,983,043 A * | 5/1961 | Peterson | ................ | 30/100 |
| 2,990,612 A * | 7/1961 | Gill | ................ | 30/100 |
| 3,001,283 A * | 9/1961 | Woods et al. | ................ | 30/100 |
| 3,048,920 A * | 8/1962 | Wheeler | ................ | 30/100 |
| 3,075,219 A | 1/1963 | Ott | | |
| 3,098,296 A * | 7/1963 | Peterson | ................ | 30/100 |
| 3,157,945 A * | 11/1964 | Picking | ................ | 30/100 |
| 3,214,824 A | 11/1965 | Brown | | |
| 3,243,878 A * | 4/1966 | Bjalme et al. | ................ | 30/100 |
| 3,421,492 A | 1/1969 | Brown | | |
| 3,719,993 A | 3/1973 | Caprioli | | |
| 3,943,626 A | 3/1976 | Williams | | |
| 3,977,331 A | 8/1976 | Clavin | | |
| 4,031,590 A | 6/1977 | Clavin | | |
| 4,663,794 A | 5/1987 | Evans | | |
| 4,691,600 A | 9/1987 | Carlson et al. | | |
| 4,694,574 A | 9/1987 | Dickinson | | |
| 4,706,748 A | 11/1987 | Harris | | |
| 4,744,123 A | 5/1988 | Le Testu et al. | | |
| 4,750,249 A | 6/1988 | Richardson | | |
| 4,798,246 A | 1/1989 | Best | | |

(Continued)

*Primary Examiner* — Jason Daniel Prone
(74) *Attorney, Agent, or Firm* — Kenneth C. Spafford (57) ABSTRACT

A pipe peeler for removing a uniform layer of material from the outer surface of a polyethylene pipe is provided. The device comprises a cuboid body, a blade with housing for retracting the blade, a chain attached to one end of the cuboid body, a threaded hook for attaching the other end of the chain to the cuboid body and tightening the chain around a pipe, and a push knob for rotating the device around the pipe in order to peel the pipe. The two points on the chain attached to the body are different distances from the end of the pipe when the chain is tightened around the pipe, thereby creating a spiral track on the pipe that the blade will follow when the device is pushed around the pipe, thereby creating a uniform spiral peel.

11 Claims, 11 Drawing Sheets

(56) References Cited

U.S. PATENT DOCUMENTS

| | | | |
|---|---|---|---|
| 4,912,799 A | 4/1990 | Coleman, Jr. | |
| 5,419,046 A | 5/1995 | Mayo, Jr. | |
| 5,600,862 A | 2/1997 | Bleske et al. | |
| 5,600,863 A | 2/1997 | Curran | |
| 5,894,808 A | 4/1999 | Miyoshi | |
| 6,122,827 A * | 9/2000 | Whitaker | 30/100 |
| 6,141,876 A * | 11/2000 | Hamm | 30/100 |
| 6,434,776 B1 | 8/2002 | Pfeiffer et al. | |
| 6,651,967 B1 * | 11/2003 | Barber | 7/139 |
| 6,698,321 B2 | 3/2004 | Oswald | |
| 6,968,762 B1 | 11/2005 | Muckle et al. | |
| 7,200,890 B2 | 4/2007 | De Franceschi | |
| 7,337,698 B2 | 3/2008 | DiBiase et al. | |
| 2009/0151096 A1 | 6/2009 | Bideault | |
| 2010/0095467 A1 | 4/2010 | Kravich | |

* cited by examiner

PIPE PEELER

BACKGROUND

This invention relates to pipe preparing tools, and more particularly to a novel device for uniformly peeling the outer surface of a polyethylene pipe.

It is often necessary to remove a portion of the exterior surface of a pipe prior to welding or otherwise affixing the pipe to a coupling. In an electrofusion process for joining plastic pipes, such as those constructed of polyethylene, it is an absolute requirement. Removal of a portion of the exterior surface of the pipe eliminates oxidation of and impurities in the exterior surface of the pipe, and helps ensure a trouble-free joint.

Uniform peeling of polyethylene pipes can be a difficult task because the pipes are often already "in the field" and affixed in place, thereby limiting the use of larger, more precise pipe peeling machines. Under these circumstances, a uniform peel can be difficult to achieve. Many pipe peelers require multiple attachments, often to the inside of the pipe being peeled, which lengthens the time required to peel the pipe.

It is an object of the present disclosure to provide a pipe peeler that will create a uniform peel on the end of a polyethylene pipe.

It is an object of the present disclosure to provide a pipe peeler that will peel in a spiral pattern on the outer surface of a polyethylene pipe.

It is an object of the present disclosure to provide a pipe peeler that does not require itself to be anchored to the inside of a pipe for use.

It is another object of the present disclosure to provide a pipe peeler that has no delicate or easily breakable exposed parts and requires minimal or no cleaning.

It is another object of the present disclosure to provide a pipe peeler that is small, compactable, and lightweight.

It is another object of the present disclosure to provide a single pipe peeler that may be used on a wide range of pipe circumferences.

It is another object of the present disclosure to provide a pipe peeler that can peel a circular or oval pipe.

It is another object of the present disclosure to provide a pipe peeler that can easily be used "in the field" on an immovable pipe.

It is another object of the present disclosure to provide a pipe peeler whereby a user can release his or her grip on the peeler and the peeler will remain in place on the pipe.

Various other features, advantages and characteristics of the present invention will become apparent to one of ordinary skill in the art after a reading of the following specification.

In the displayed embodiment, the pipe peeler comprises a cuboid body, a retractable blade, a chain, means for attaching the chain to the front and back of the body, a threaded hook for pulling the chain towards the body (and thereby tightening the chain around a pipe), and a grip knob. The two connection points of the chain to the body are offset so that the chain forms a spiral arc when the chain is tightened around a pipe.

As used herein, term "chain" is meant to include other devices which may encircle a pipe, including but not limited to cables, belts, cords, ropes, harnesses, clamps, and so on.

The particular embodiment described below is proven to uniformly peel polyethylene pipe. However, this embodiment and obvious modifications thereof may also uniformly peel pipes with material properties similar to polyethylene. This disclosure and the claims herein are directed toward peelers for pipe with material properties similar to polyethylene.

REFERENCE NUMERALS

10 Pipe Peeler
12 Peeler front face
14 Peeler back face
16 Peeler blade face
18 Peeler top face
20 Peeler body
22 Grip knob
24 Grip shaft
26 Hook
28 Wheels
30 Blade
32 Threaded hook shaft
34 Female threaded cylinder
36 Pivot bar
38 Apertures
40 Blade knob
42 Notch
44 Blade knob projection
46 Blade shaft
48 Holding pin
50 Blade body
52 Blade body bolts
54 Pivot bar recess
56 Blade stop
58 Holding pin recess
60 Blade stabilizing elliptical opening
62 Blade stabilizing pin
64 Chain
66 Magnet
68 Pipe
70 Cylinder handle

DESCRIPTION OF EMBODIMENT

Figure 3A:
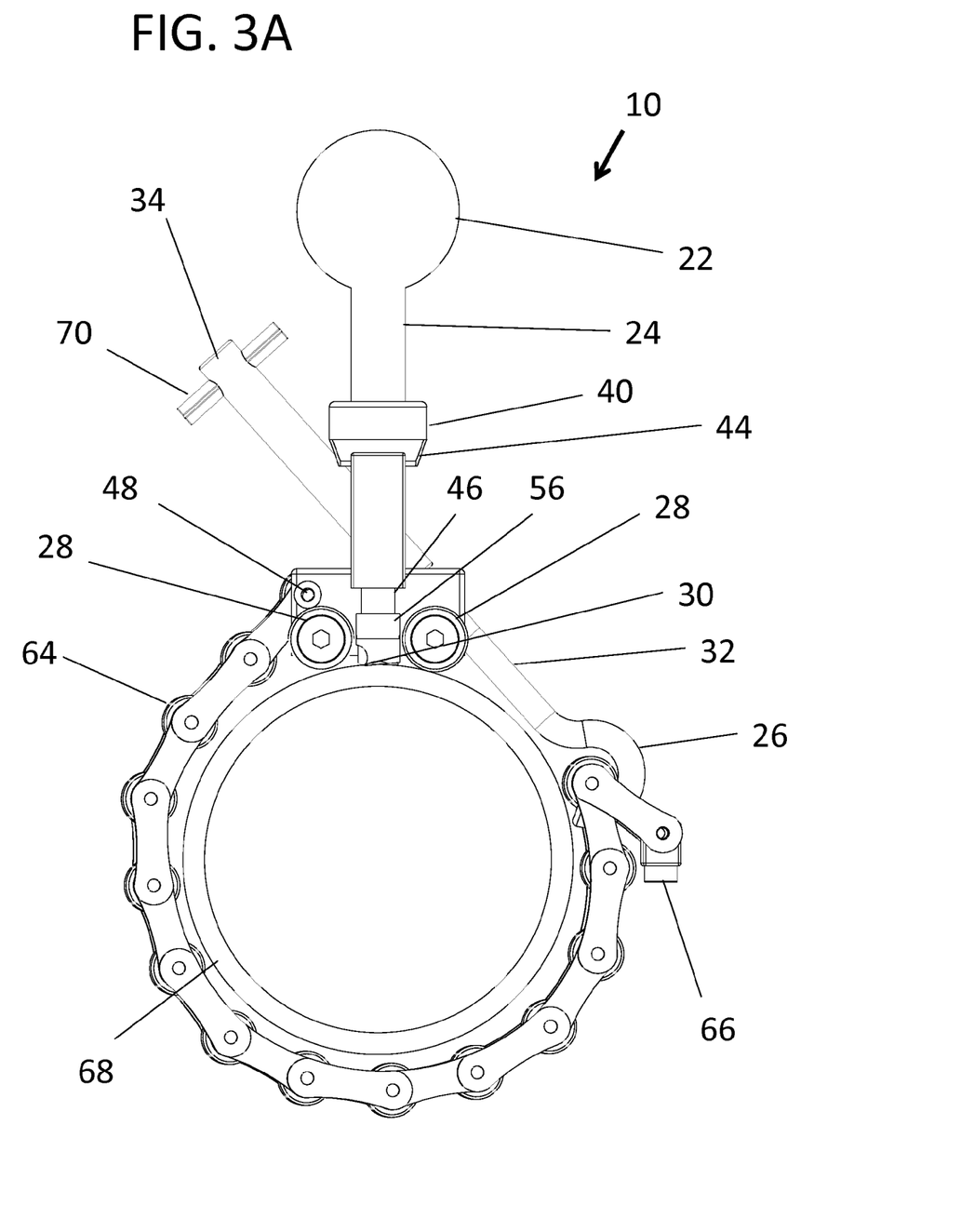
FIG. 3A is a side view of the complete embodiment of the invention, in use on a pipe.
Figure 3B:
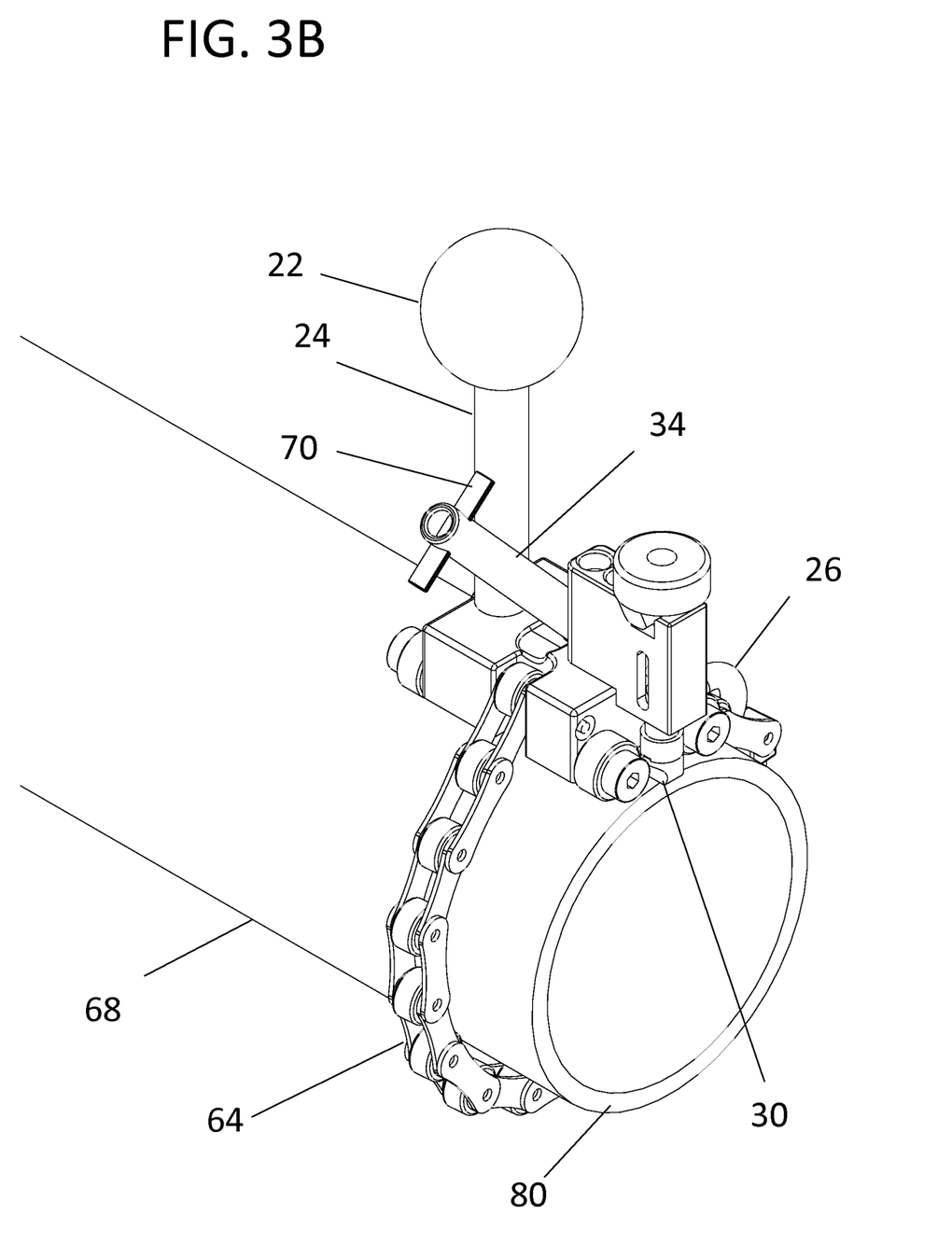
FIG. 3B is a side perspective view of the embodiment of FIG. 3A.
Figure 3C:
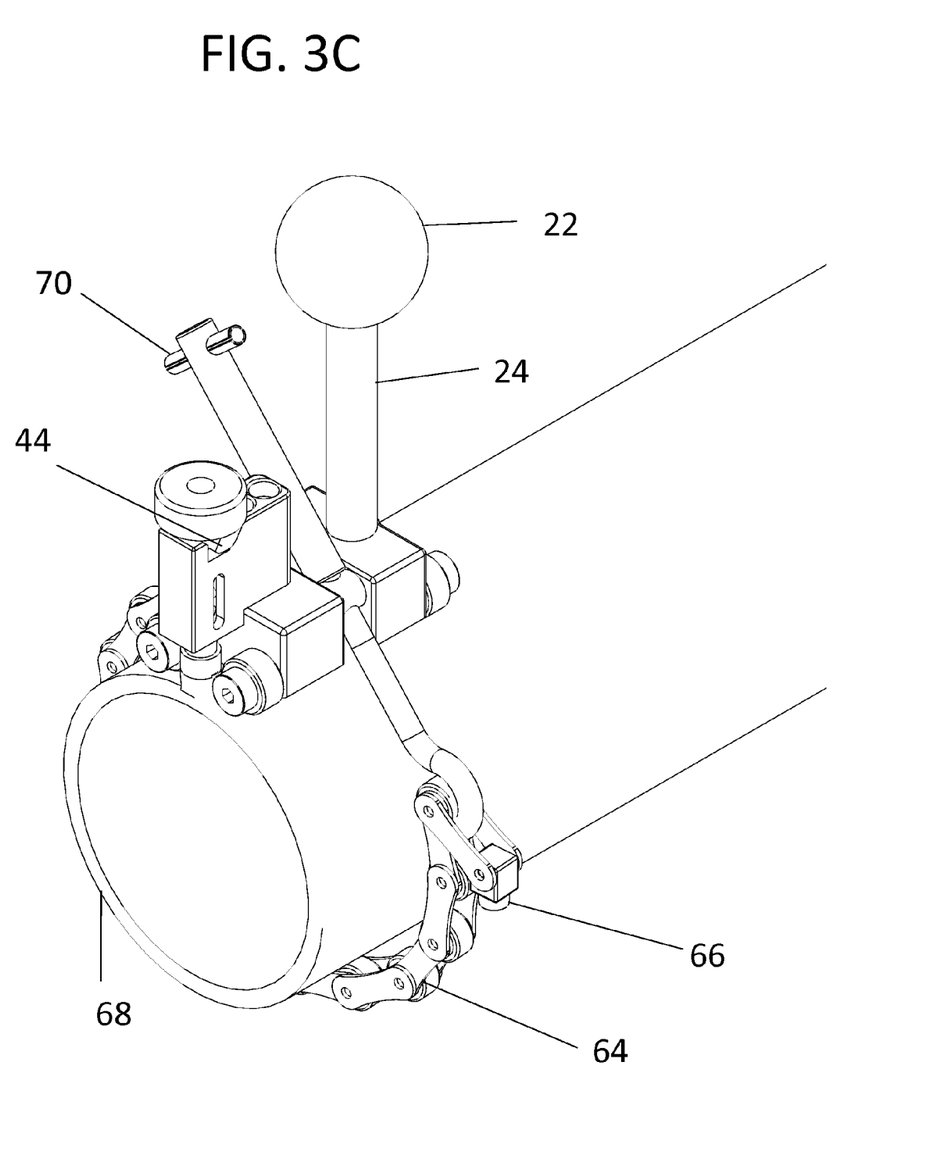
FIG. 3C is a side perspective view of the embodiment of FIG. 3A.

An embodiment of the pipe peeler surrounding a pipe is shown in FIGS. 3A, 3B, and 3C generally at 10. In this embodiment, all of the parts of the pipe peeler 10 may be made of metal but are interchangeable with other materials obvious to those skilled in the art.

Figure 1:
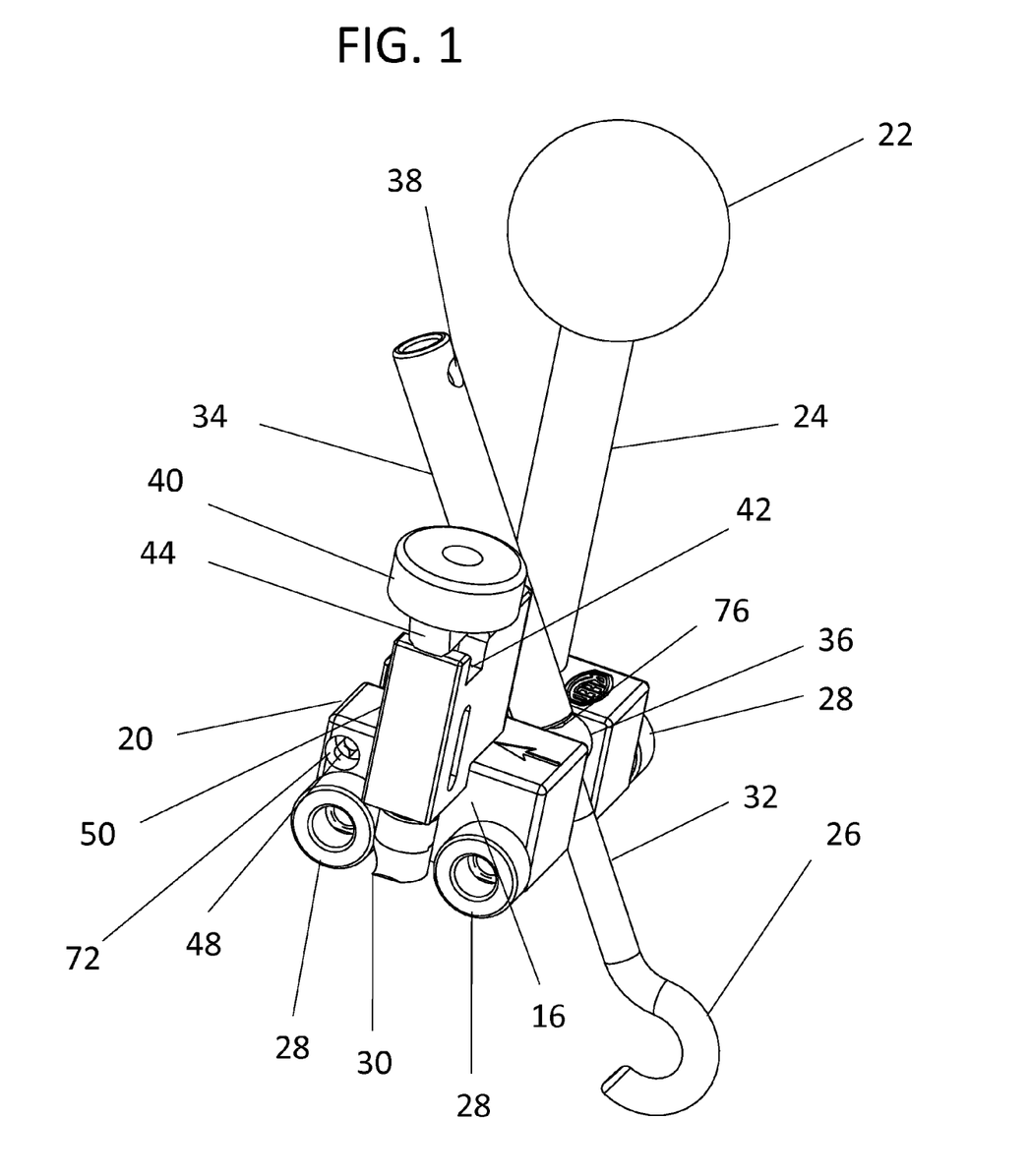
FIG. 1 is a side perspective view of some parts of an embodiment of the invention, with some parts omitted in order to provide a clear view of the parts shown therein.

Referring to FIG. 1, the pipe peeler 10 includes a peeler body 20. In this embodiment, peeler body 20 is generally cuboid-shaped but other embodiments may take other shapes without adverse effect on the device's functionality.

Four wheels 28 are attached to the peeler body 20. The wheels 28 do not need to be able to turn. The wheels 28 can be bolted or otherwise permanently affixed to the body 20.

Grip shaft 24 is affixed to peeler top face 18, wherein the affixing may be done by a male thread (not shown) on the grip shaft 24 and female thread (not shown) in the peeler body 20, or other affixing means such as welding or manufacturing the peeler body 20 and grip shaft 24 in one piece. Likewise, grip knob 22 is affixed to grip shaft 24, using, for example a male thread (not shown) on the grip shaft and a female thread (not shown) in the grip knob, or other means such as welding or manufacturing the knob 22 and shaft 24 as one piece.

Figure 2A:
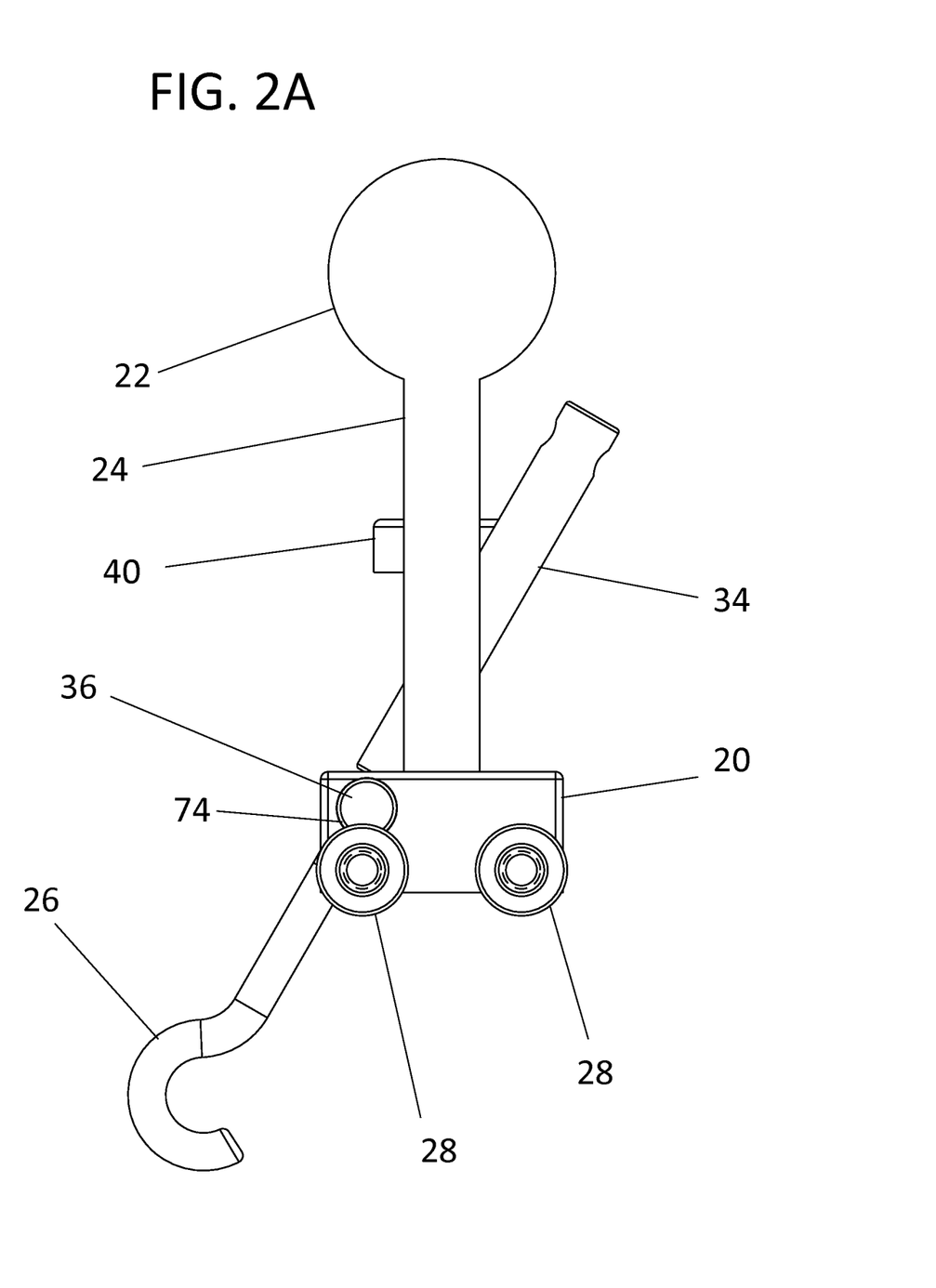
FIG. 2A is a side view of the parts of the embodiment of FIG. 1.
Figure 2B:
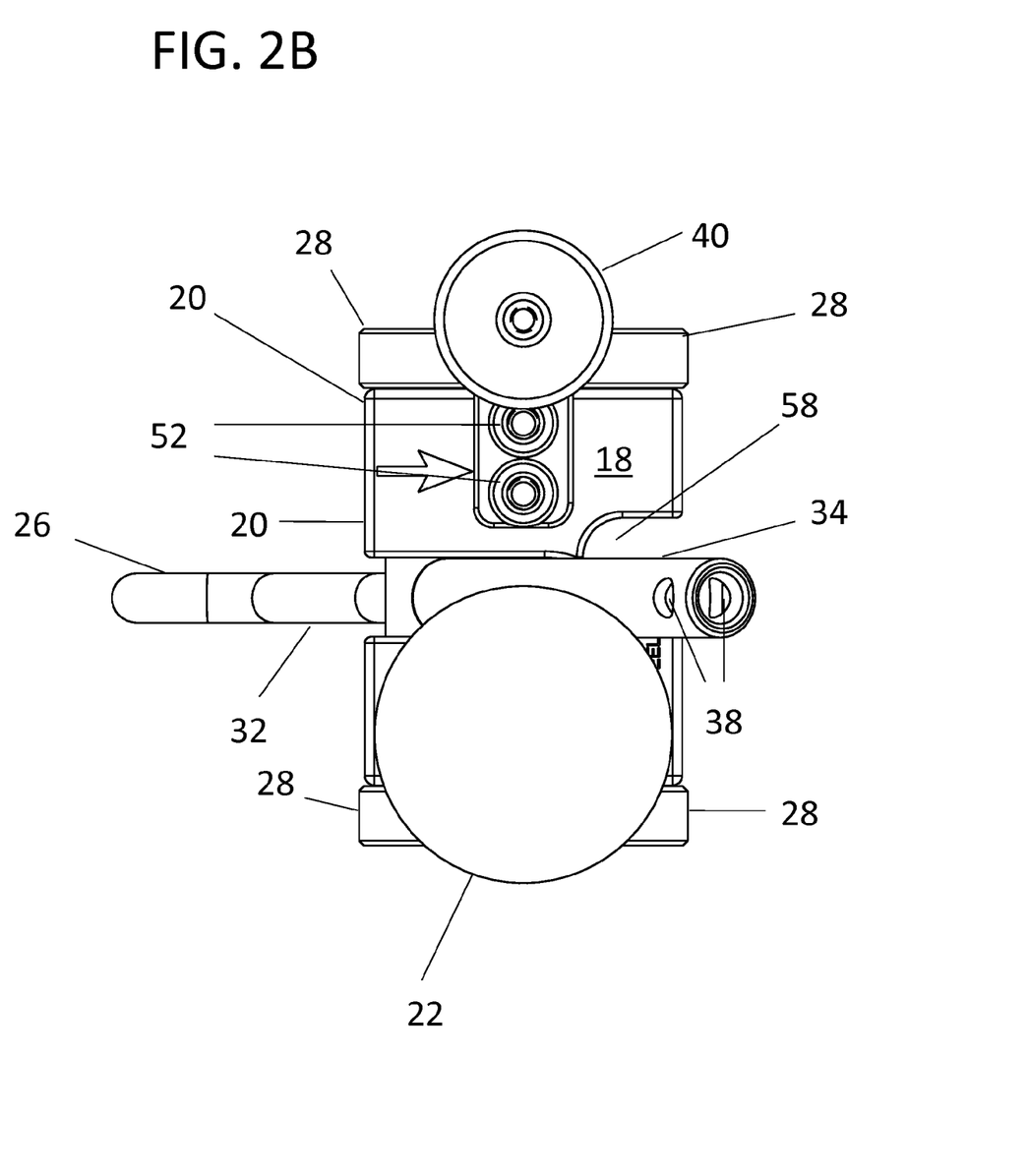
FIG. 2B is a top view of the parts of the embodiment of FIG. 1.

As shown in FIG. 2B, peeler front face 12 includes a holding pin recess 58. Holding pin 48 is affixed inside holding pin recess 58 and is parallel to peeler front face 12. As seen in FIG. 1, one end of holding pin 48 is inside holding pin aperture 72, while the other end of holding pin 48 may be affixed to the holding pin recess 58 wall opposite holding pin aperture 72 using, for example, a male thread (not shown) on the holding pin end and a receiving female thread (not shown) on holding pin recess 58 wall opposite the holding pin aperture 72, with, for example, a flathead screwdriver receptor or hex key receptor at the end of the holding pin 48 that is exposed on peeler blade face 16 through holding pin aperture 72. An alternative to this drawn embodiment is, for example, welding the holding pin 48 in place. The holding pin 48 does not need to be able to rotate when the pipe peeler 10 is in use.

Peeler back face 14 includes a pivot bar recess 54. Pivot bar 36 is inside pivot bar recess 54 and is parallel to peeler back face 14. One end of pivot bar 36 is inside pivot bar aperture 74, while the other end of pivot bar is inside a recess (not shown) on pivot bar recess 54 wall opposite pivot bar aperture 74. As shown in FIG. 2A, one of the wheels 28 holds pivot bar 36 in place. Pivot bar 36 should be able to rotate when the pipe peeler 10 is in use.

Threaded hook shaft 32 goes through hook pivot aperture 76. Female threaded cylinder 34 affixes to threaded hook shaft 32. Threaded hook shaft is connected to, or manufactured as one piece with, hook 26. Cylinder handle 70 is in female threaded cylinder 34 through cylinder apertures 38. In this embodiment, cylinder handle 70 is held in place inside female threaded cylinder 34 with spring resistance and friction, but may be held in place using other means such as, for example, welding or manufacturing the female threaded cylinder 34 and cylinder handle 70 as one piece.

Blade body 50 is affixed to peeler body 20 with two blade body bolts 52 threaded through two female threaded receptors (not shown) on peeler top face 18. Alternatively, blade body 50 may be affixed to peeler body 20 with welding or other means obvious to those skilled in the art.

Blade shaft 46 goes through blade body 50 through a cylindrical aperture (not shown) in blade body 46. Blade shaft 46 is attached to blade knob projection 44. Blade knob projection is attached to blade knob 40. The opposite end of blade shaft 46 is attached to blade stop 56. Blade stop 56 is attached to blade 30. Alternatively, both blade 30 and blade stop 56 may be attached to blade shaft 46 directly with, for example, a male thread on blade shaft 46 and female threads in blade stop 56 and blade 30.

Blade stabilizing pin 62 is affixed to blade shaft 46. Inside blade body 50 a compressed spring 90 pushes against blade stabilizing pin 62 such that the natural tendency of the spring 90 is to push blade stop 56 and blade 30 away from blade body 50 and push blade knob 40 and blade knob projection 44 toward blade body 50. The compressed spring 90 may surround blade shaft 46.

Blade stabilizing pin 62 may move along the major axis of blade stabilizing elliptical opening 60, allowing blade 30 to be in a raised or lowered position. However, blade stabilizing pin may not move on the minor axis of blade stabilizing elliptical opening 60, thereby preventing blade shaft 46 and blade 30 from rotating.

Figure 2C:
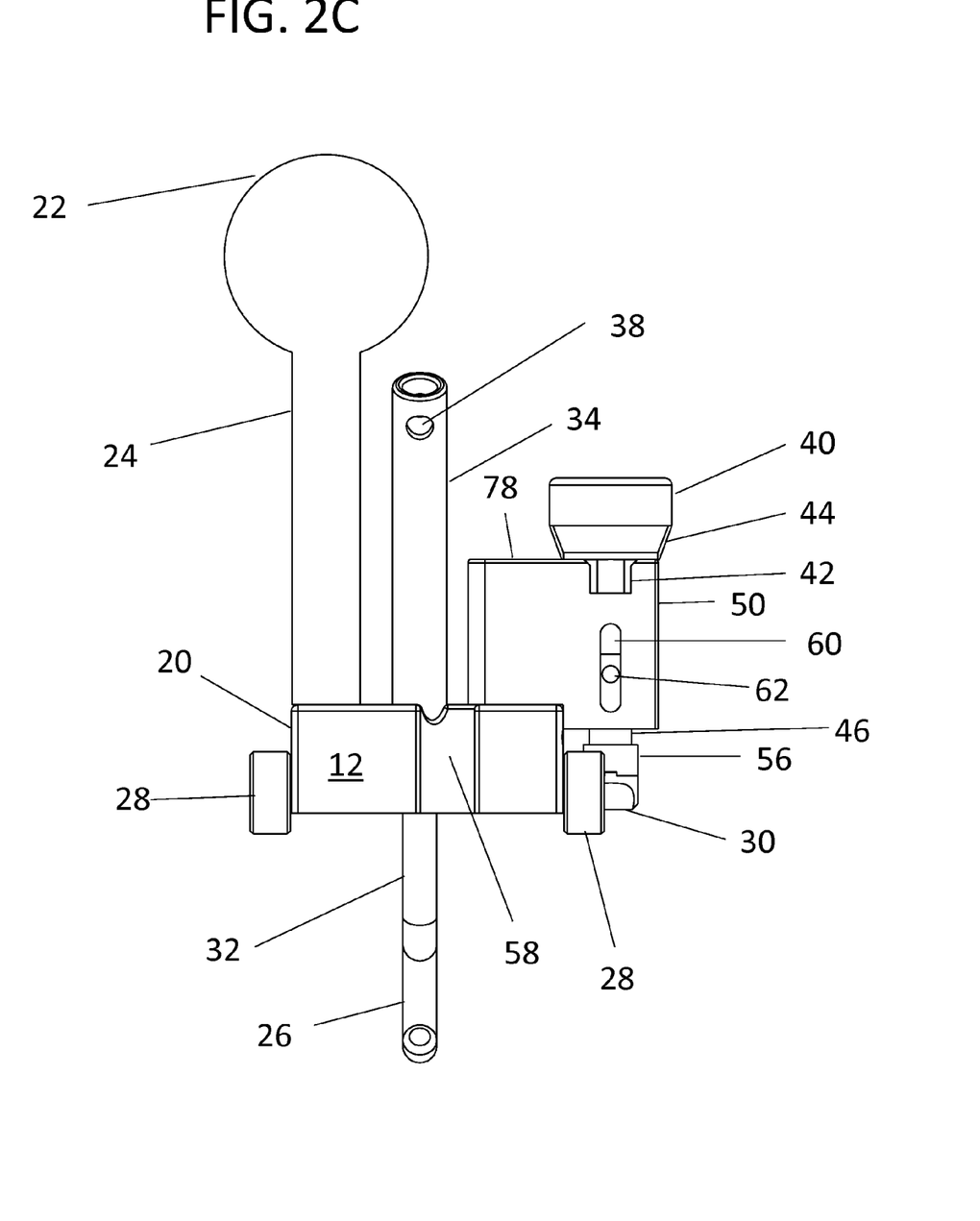
FIG. 2C is a front view of the parts of the embodiment of FIG. 1.

As shown in FIG. 2C, when blade knob projection 44 presses against blade body top face 78, blade 30 does not extend downward beyond wheels 28. As shown in FIG. 3B, when blade knob projection 44 is in blade body notch 42, blade 30 is fully extended and may extend beyond wheels 28 and press against a pipe 68. Thus, blade 30 may be raised by turning blade knob 40 clockwise and lowered by turning blade knob 40 counterclockwise.

Before wrapping chain 64 around a pipe 68, blade 30 is in raised position, i.e., blade knob extension 44 is resting against blade body top face 78.

Turning now to FIGS. 3A, 3B, and 3C, one end of a chain 64 is attached to peeler body 20. Chain 64 is wrapped around a pipe 68, and hook 26 threads through chain 64 at a point that enables chain 64 to wrap as tightly as possible around pipe 68. As seen in FIG. 3B, at this point pipe peeler 10 may be positioned on pipe 68 such that blade 30 is positioned over the pipe end 80 to be peeled.

Chain 64 is further tightened by turning cylinder handle 70, thereby pulling threaded hook shaft 32 and hook 26 into female threaded cylinder 34 and pulling chain 64 toward peeler body 20. Tightening is continued until pipe peeler 10 is immobile on pipe 68 and will not slide off of pipe even when pipe peeler 10 is not being held by a user.

If the length of chain 64 is much larger that pipe 68 circumference and the part of chain 64 not being used extends far beyond point at which hook 26 threads through chain, a magnet 66 at end of chain 64 will attach excess loose chain 64 to chain 64 surrounding pipe 68.

Once chain 64 is fully tightened around pipe 68, blade knob 40 may be turned such that blade projection 44 rests in blade body notch 42 thereby allowing blade 30 to extend downward and contact pipe, as seen in FIG. 3B.

Figure 4A:
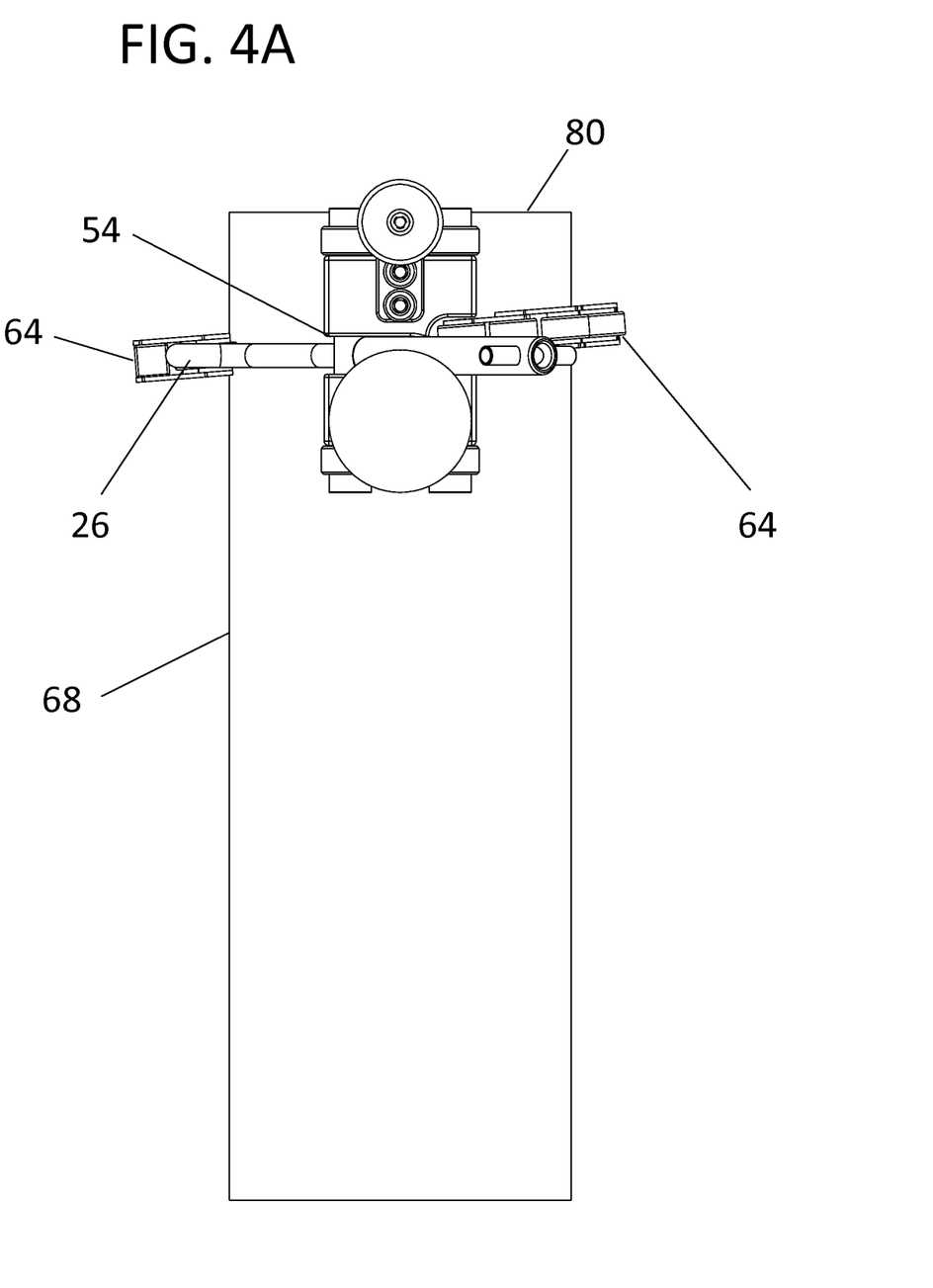
FIG. 4A is a top view of the embodiment of FIG. 3A.
Figure 4B:
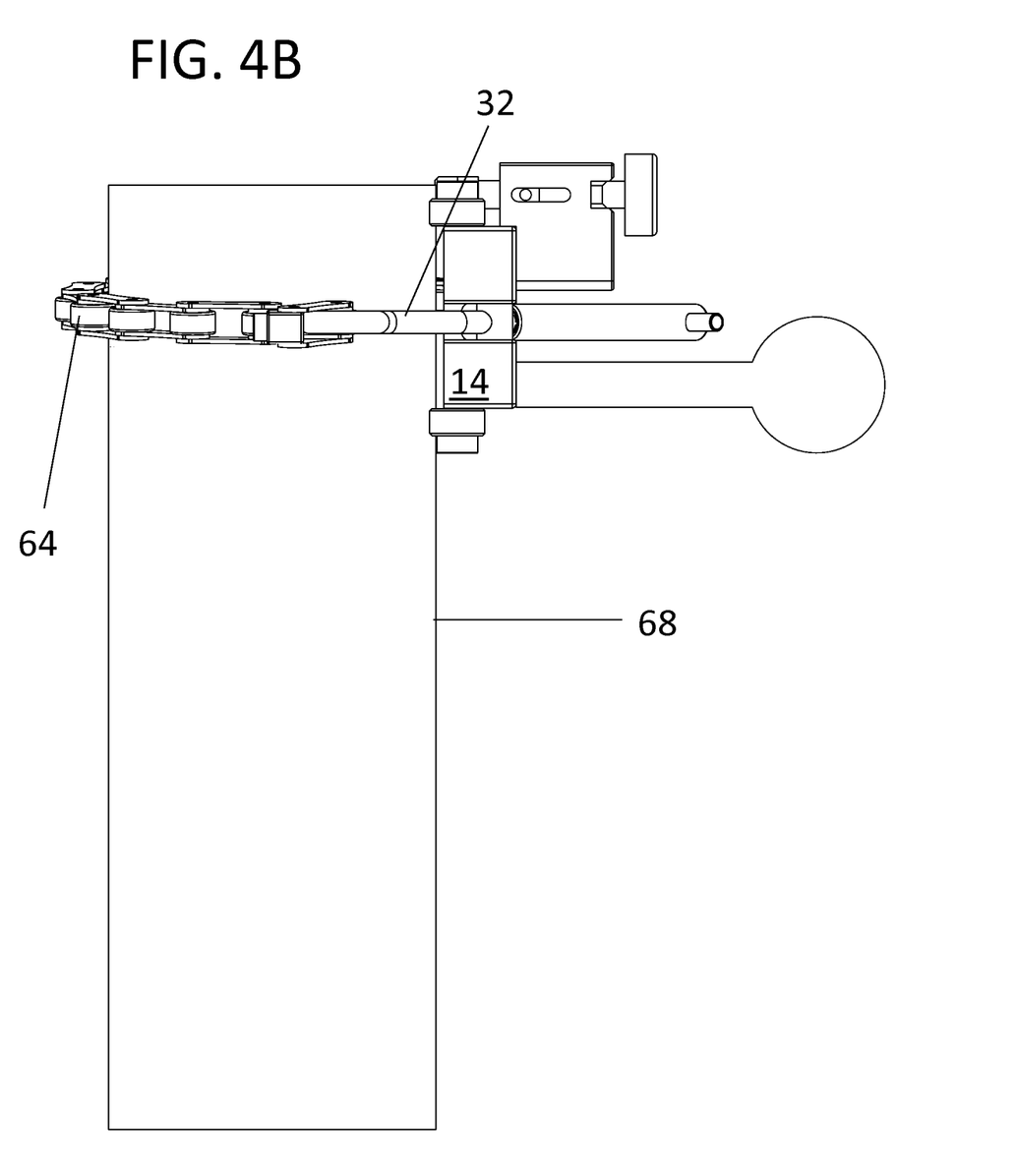
FIG. 4B is a rear view of the embodiment of FIG. 3A.
Figure 4C:
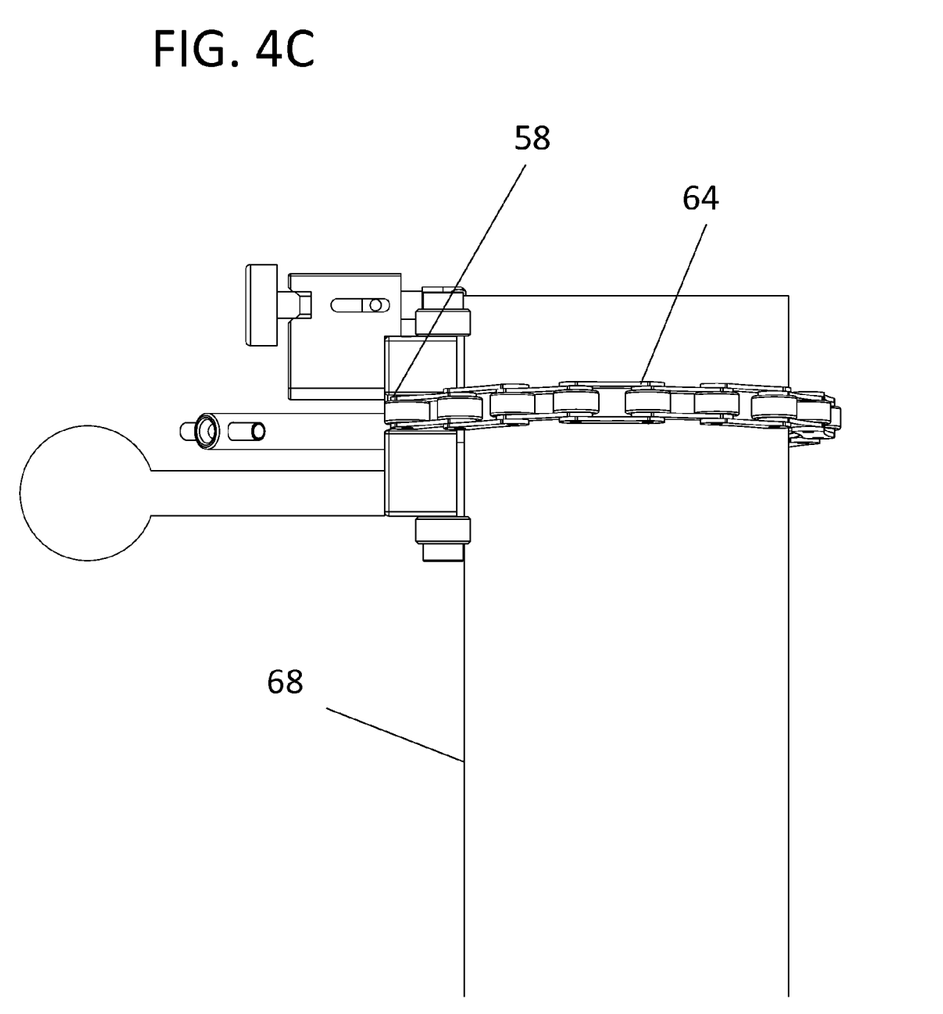
FIG. 4C is a front view of the embodiment of FIG. 3A.
Figure 5:
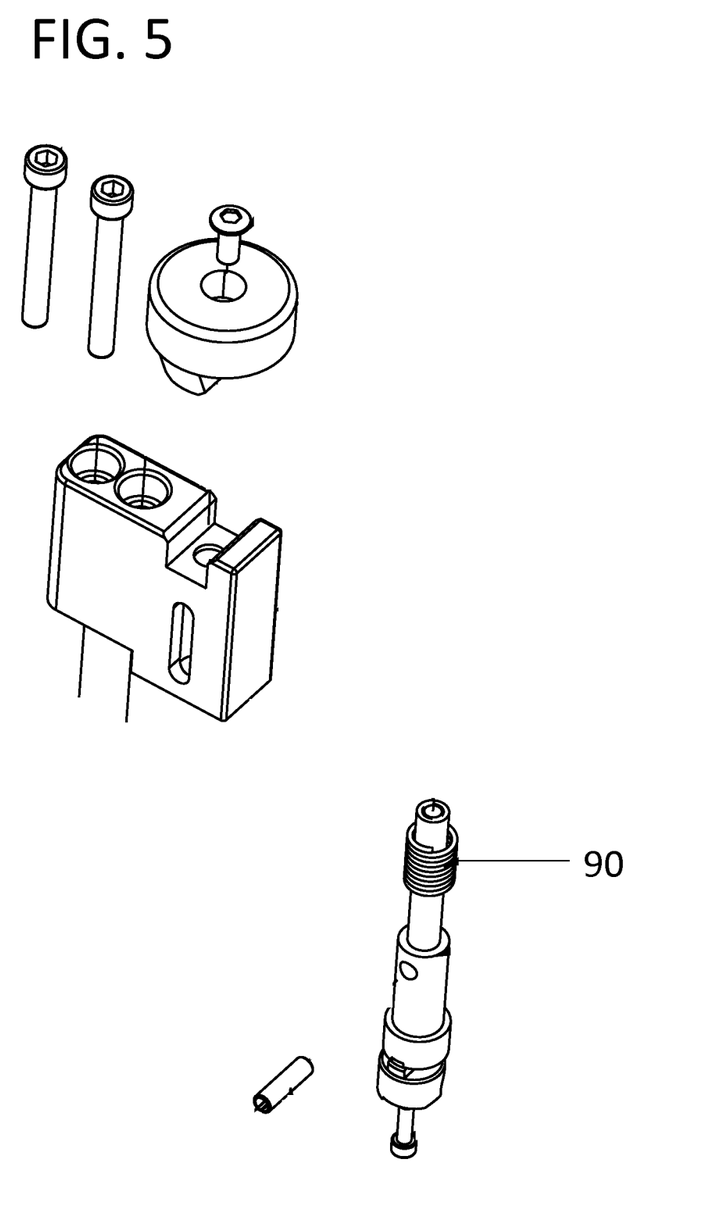
FIG. 5 is an exploded view of a portion of the embodiment shown in FIGS. 3A-3C.

As shown in FIG. 4A, chain 64 is slightly offset where the chain end connected to holding pin 48 is closer to pipe end 80 and the chain point connected to hook 26 is slightly farther away from pipe end 80.

Once chain 64 is fully tightened and blade 30 is extended to press against pipe 68, grip knob 22 is pushed in a direction tangential to pipe circumference, toward peeler front face 12, such that pipe peeler 10 rotates around pipe 68 thereby allowing blade 30 to peel the outer surface of the pipe 68.

Due to the slightly giving and springy nature of polyethylene pipe, the pressure of the chain 64 against the pipe 68 will cause the chain 64 to press a temporary "track" into the pipe 68. As pipe peeler 10 is rotated around pipe 68, the chain 64 "track" will direct the pipe peeler 10 to move down the pipe 68 in a uniform spiral, thereby allowing the blade 30 to create a uniform peel. The chain leaves none, or very minimal, permanent "track" on the pipe.

In this embodiment, the width of the blade 30 is greater than the distance that the pipe peeler 10 travels away from the pipe end 80 during one full rotation of the pipe peeler 10 around the pipe 68.

Once the pipe 68 has been peeled a satisfactory amount, blade knob 40 may be turned clockwise to raise blade 30. Cylinder handle 70 is turned to allow hook 26 to move away from female threaded cylinder 34, thereby allowing chain 64 to loosen and enabling pipe peeler 10 to be removed from pipe 68.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A device for peeling a pipe, comprising:
   (A) a body;
   (B) a blade attached to said body;
   (C) a chain;
   (D) a first fastener, wherein said first fastener is operable to attach a first point on said chain to said body;
   (E) a chain tightener, wherein
      (1) said chain tightener includes a second fastener, and wherein said second fastener is operable to attach a second point on said chain to said body, and
      (2) wherein said chain tightener is operable to reduce any a distance between said second point and said body when said second point is attached to said second fastener,
   wherein said chain between said first and second points defines a helix when said first and second points are attached to said first and second fasteners respectively and when every point on said chain between said first and second points is extended a maximum average distance from all other points on said chain that are between said first and second points.

2. The device of claim 1, wherein said second fastener includes a hook.

3. The device of claim 1, further comprising a spring operable to cause said blade to exert substantially uniform downward pressure.

4. The device of claim 3, further comprising a means to move said blade upward and nullify said spring's operability to cause said blade to exert substantially uniform downward pressure.

5. The device of claim 1, wherein said second point on said chain may be any one of at least three different locations on said chain.

6. A device for peeling a pipe, comprising:
   (A) a body;
   (B) a blade attached to said body;
   (C) a chain;
   (D) a first fastener, wherein said first fastener is operable to attach a first point on said chain to said body;
   (E) a chain tightener, wherein
      (1) said chain tightener includes a second fastener, and wherein said second fastener is operable to attach a second point on said chain to said body, and
      (2) wherein said chain tightener is operable to reduce any a distance between said second point and said body when said second point is attached to said second fastener,
   wherein said chain between said first and second points defines a helix when said first and second points are attached to said first and second fasteners respectively and when said chain between said first and second portions is positioned as an arc portion of a circle.

7. The device of claim 6, wherein said second fastener includes a hook.

8. The device of claim 6, further comprising a spring operable to cause said blade to exert substantially uniform downward pressure.

9. The device of claim 6, further comprising a means to move said blade upward and nullify said spring's operability to cause said blade to exert substantially uniform downward pressure.

10. The device of claim 6, wherein said second point on said chain may be any one of at least three different locations on said chain.

11. A device for peeling a pipe, comprising:
    (A) a body;
    (B) a blade attached to said body;
    (C) a chain;
    (D) a first fastener, wherein said first fastener is operable to attach a first point on said chain to said body;
    (E) a chain tightener, wherein
       (1) said chain tightener includes a second fastener, and wherein said second fastener is operable to attach a second point on said chain to said body, and
       (2) wherein said chain tightener is operable to reduce any a distance between said second point and said body when said second point is attached to said second fastener,
    wherein said first and second fastener are located on opposing sides of said body, and wherein said first and second fasteners are offset from one another, such that said chain defines a helix when said first and second points are attached to said first and second fasteners respectively and when said chain is wrapped and tightened around the pipe.

* * * * *